US012152736B2

(12) United States Patent
Wilms et al.

(10) Patent No.: US 12,152,736 B2
(45) Date of Patent: Nov. 26, 2024

(54) SYSTEM AND METHOD FOR COMPRESSED GAS DISPENSING WITH SUBSEQUENT VENTING

(71) Applicant: Air Products and Chemicals, Inc., Allentown, PA (US)

(72) Inventors: Jillian N. Wilms, Long Beach, CA (US); Joseph P. Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 119 days.

(21) Appl. No.: 18/096,085

(22) Filed: Jan. 12, 2023

(65) Prior Publication Data

US 2024/0240758 A1 Jul. 18, 2024

(51) Int. Cl.
*F17C 6/00* (2006.01)

(52) U.S. Cl.
CPC ........ *F17C 6/00* (2013.01); *F17C 2205/0326* (2013.01); *F17C 2205/0352* (2013.01); *F17C 2221/012* (2013.01); *F17C 2221/033* (2013.01); *F17C 2250/032* (2013.01); *F17C 2250/043* (2013.01); *F17C 2250/0636* (2013.01); *F17C 2265/061* (2013.01)

(58) Field of Classification Search
CPC ................ F17C 5/00; F17C 2205/0338; F17C 2265/065; B67D 7/04; B67D 7/845; B67D 7/08; B67D 7/84; B67D 7/0272; B67D 7/048; B67D 7/0492; B67D 7/3263; B67D 7/36; B67D 7/0238; B67D 7/78
See application file for complete search history.

(56) References Cited

U.S. PATENT DOCUMENTS

| | | | | | |
|---|---|---|---|---|---|
| 5,765,603 | A * | 6/1998 | Healy | B67D 7/32 141/7 |
| 9,638,374 | B2 * | 5/2017 | Lambrix | F17C 13/023 |
| 9,863,583 | B2 * | 1/2018 | Youlio | F17C 13/025 |
| 10,167,999 | B2 * | 1/2019 | Handa | F17C 5/007 |
| 10,502,649 | B1 * | 12/2019 | Cohen | B65D 83/14 |
| 2022/0128392 | A1 | 4/2022 | Liquide | |

FOREIGN PATENT DOCUMENTS

WO WO-2022229634 A1 * 11/2022 .............. F17C 13/04

* cited by examiner

*Primary Examiner* — Timothy L Maust
(74) *Attorney, Agent, or Firm* — Matthew R. Weaver

(57) ABSTRACT

A dispensing system for dispensing compressed gas into a receiving vessel, comprising: a supply of compressed gas; a fill line for connecting the supply of compressed gas to the receiving vessel; a fill valve to vary the flow of compressed gas through the fill line; a controller to control the fill valve; a vent line for venting the fill line downstream of the fill valve; a vent line restriction to restrict flow of the compressed gas through the vent line; and a vent pressure sensor to sense a vent pressure representative of an instantaneous pressure of the compressed gas in the vent line upstream of the vent line restriction and to generate a vent pressure signal based on the sensed vent pressure.

17 Claims, 1 Drawing Sheet

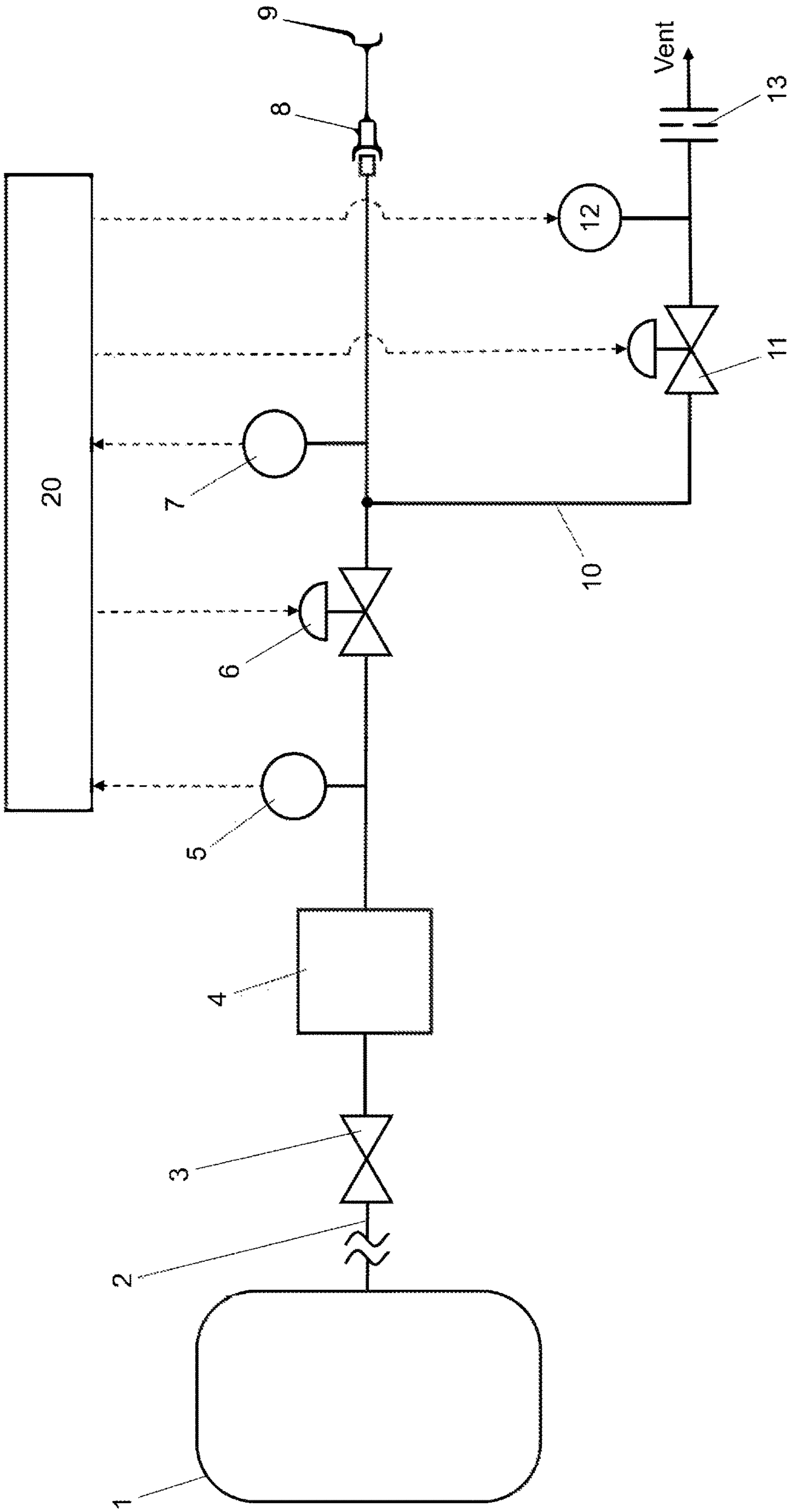
9
8
Vent
13
12
11
20
7
10
6
5
4
3
2
1

SYSTEM AND METHOD FOR COMPRESSED GAS DISPENSING WITH SUBSEQUENT VENTING

BACKGROUND

The present invention relates to a system and method for dispensing a compressed gas into a receiving vessel and, more specifically, to a system and method for dispensing the gas in the correct quantity into, for example, a vehicle fuel tank. The gas may comprise or consist of hydrogen, natural gas, one or more hydrocarbons, and mixtures thereof.

For charging a quantity of compressed gas dispensed into a receiving vessel it is necessary to measure this quantity accurately. A customer should be charged the quantity actually received. For example, in determining the quantity of compressed gas dispensed, consideration should be given to the fact that a fill line through which the compressed gas is delivered to the receiving vessel, such as a vehicle fuel tank, must be vented before it is disconnected from the receiving vessel. Dispensing systems are therefore equipped with venting systems that include a vent line with a shut-off valve which is closed during dispensing and opened at the end of dispensing to vent the fill line.

Flow meters in combination with pressure and temperature sensors are used to measure the quantity of dispensed gas. In view of the need to vent the fill line at the end of the dispensing process, it is proposed in US 2022/0128392 A1 to arrange a flow meter in the fill line and another flow meter in the vent line. The quantity of vented gas is measured by means of the vent line flow meter and subtracted from the total quantity measured by means of the fill line flow meter. Thus, the customer does not have to pay for the vented gas. With this arrangement, the vented gas is properly accounted for as long as the dispensing system is functioning properly.

It is an object of the present invention to provide a system and method for dispensing a compressed gas into a receiving vessel that prevents errors in determining the amount of compressed gas dispensed into the receiving vessel.

There is a need for a system and method for safely and smoothly dispensing a compressed gas, particularly hydrogen, into the fuel tank of an internal combustion engine or fuel cell vehicle.

It is also desirable to ensure proper operation of in-line components in a system and method for dispensing a compressed gas, such as hydrogen, into a receiving vessel.

SUMMARY

The present invention relates to a system and a method for dispensing a compressed gas into a receiving vessel. The dispensing system comprises a supply of compressed gas, a fill line for connecting the supply to the receiving vessel, a discharge nozzle at a downstream end of the fill line, a fill valve disposed and configured to vary the flow of compressed gas through the fill line, and a controller configured to control the fill valve. The fill valve and the controller may be configured to vary the gas flow rate continuously or incrementally. However, in expedient embodiments, the fill valve is a shut-off valve that selectively blocks or allows the flow of compressed gas through the fill line.

The supply of compressed gas may comprise one or more stationary compressed gas storage vessels fixedly disposed at a dispensing location and/or one or more mobile compressed gas storage vessels disposed on a truck or tube trailer. The supply of compressed gas may comprise one or more stationary storage vessels and/or one or more mobile storage vessels containing the gas in the liquified state or in a mixed liquid-gaseous phase. The supply of compressed gas may comprise a connection to a supply pipeline for obtaining the gas from a remote gas supply. Regardless of the one or more sources for the gas, the supply of compressed gas may comprise one or more pumps and/or one or more compressors and/or one or more heat exchangers and optional further components for feeding and/or pressurizing and/or thermally conditioning the gas to provide the gas at a pressure and a temperature suited for dispensing into the receiving vessel.

The dispensing system further comprises a vent line for venting the fill line downstream of the fill valve, a vent line restriction disposed and configured to restrict flow of the compressed gas through the vent line, and a vent pressure sensor disposed and configured to sense a vent pressure which is representative of an instantaneous pressure of the compressed gas in the vent line upstream of the vent line restriction and to generate a vent pressure signal based on the sensed vent pressure.

The dispensing system and in particular the vent pressure sensor may be configured to measure the pressure in the vent line only once after completion or termination of dispensing to the respective receiving vessel and/or only once while dispensing to the respective receiving vessel. However, it is expedient if the dispensing system and in particular the vent pressure sensor are configured in such a way that the pressure in the vent line is measured repeatedly during venting after completion or termination of the respective dispensing process. The dispensing system and the vent pressure sensor may be configured to measure the pressure in the vent line during dispensing to detect any leakage in the vent line. Even more advantageous, the system and in particular the vent line pressure sensor are configured in such a way that the pressure in the vent line is measured repeatedly while venting and also while dispensing.

Present dispensing systems lack measuring devices in the vent line suitable for troubleshooting leaks, constrictions, and blockages of in-line components. In addition, without accurately catching when gas is not being provided to a customer, there is a risk of overcharging for gas, which negatively impacts the customer. A flow meter in the vent line is suitable for measuring the amount of gas leaving the dispensing system through the vent line. However, pressure change is a more reliable means of detection than reliance on flow rates and a vent pressure sensor in the vent line is a more reliable gauge to determine if compressed gas is escaping through the vent line when it should not. The detection of malfunctions in the venting subsystem is consequently not known in the prior art. Specific to detecting plugging of a vent line restriction orifice and/or plugging or leaking of other in-line components, there is no instrumentation-based visibility of plugging in known vent systems. A plugged vent line orifice would be identified by customers struggling to detach the nozzle from their vehicle. Detection of these events before an orifice becomes significantly plugged minimizes impact to fueling customers.

The controller may accordingly be configured to determine whether the vent line restriction is plugged using the vent pressure signal during venting and, if plugging is detected, to prevent detachment of the discharge nozzle from the receiving vessel and/or a next dispensing process from being initiated before the plugging is cleared. To detect plugging of the vent line restriction, the controller may calculate the deviation between the vent pressure and a reference pressure. The reference pressure may be provided as a predetermined set pressure stored in a data memory of the controller or derived from a measurement of the actual ambient pressure, e.g. simply as ambient pressure or as ambient pressure plus a certain pressure difference of advantageously less than 1 bar.

The system may comprise a vent valve disposed upstream of the vent line restriction and configured to vary the flow of compressed gas through the vent line. The vent valve may be configured to vary the gas flow rate continuously or incrementally. However, in expedient embodiments, the vent valve is a shut-off valve that selectively blocks or allows the flow of compressed gas through the vent line.

The vent pressure sensor may be disposed and configured to sense the vent pressure downstream of the vent valve at a location between the vent valve and the vent line restriction. If the pressure in the vent line does not rise or rises insufficiently when the vent valve is opened after completion or termination of dispensing, this indicates that the vent valve is plugged. By measuring the pressure between the vent valve and the vent line restriction during dispensing to the receiving vessel, a leak of the vent valve can be reliably detected, since the vent line restriction prevents an instantaneous pressure equalization with the environment. To detect a leak, the measured pressure in the vent line may be compared to a reference pressure, e.g. the ambient pressure or a set pressure and/or a vent pressure previously measured during dispensing to the same receiving vessel. During dispensing, i.e. with the fill valve open, a vent pressure above ambient pressure or a set pressure and/or a pressure increase in the vent line would indicate a leaking vent valve.

The controller may be configured to control the vent valve based on the state of the fill valve, for example, to open the vent valve after the fill valve is closed, and preferably only when the fill valve is closed. The controller may be configured to control the vent valve to block the flow of compressed gas through the vent line while compressed gas is being dispensed into the receiving vessel and to allow the flow of compressed gas through the vent line once the dispensing operation has been terminated. The controller may be configured to control the fill valve to block the fill line, thereby fluidically separating the receiving vessel from the supply, and open the vent valve to allow the flow of compressed gas through the vent line once the fill valve has been closed. The controller may be configured to control the fill valve in coordination with controlling the vent valve such that the fill valve is opened to allow flow of compressed gas through the fill line when the vent valve is closed and blocks flow of compressed gas through the vent line. Expediently, the fill valve is opened only when the vent valve is closed.

The vent line restriction can be an orifice or a throttle or be formed by a check valve that prevents gas and/or liquid from the environment, e.g. ambient air, from entering via an outlet of the vent line. The vent line restriction is a local flow resistance that delays the pressure equalization during venting. Without local restriction, the vent line would depressurize abruptly. Venting at the end of filling a receiving vessel with a filling pressure of 300 bar or more would cause a significant, gunshot-like noise. The vent line restriction may be configured to take at least 1 second or at least 2 seconds to equalize a pressure differential between a maximum nominal pressure and ambient pressure across the vent line restriction. A delay of up to 20 seconds or up to 10 seconds is acceptable. Accordingly, the vent line restriction may be configured to equalize the vent line from the maximum nominal pressure to ambient pressure within a period of no more than twenty seconds or no more than ten seconds, with ten seconds being preferred as an upper limit. The maximum nominal pressure can be the maximum filling pressure for which the system is designed or any design pressure above the maximum filling pressure. For example, the maximum nominal pressure can be 350 bar or 700 bar. For the ambient pressure one can assume 1 bar.

Via the local vent line restriction, the vent line narrows from a vent line cross-section, $A_{10}$, to a smallest flow cross-section, the restriction cross-section $A_{13}$. The ratio $A_{10}/A_{13}$ may expediently be at least 200 or at least 400 or at least 900. A ratio $A_{10}/A_{13}$ of 2500 may be regarded as an upper limit. Expediently, the ratio is lower than 2500 or lower than 2000. Ratios of 1600±200 are preferred. If the flow cross-section of the vent line upstream of the vent line throttle and also the throttle cross-section are circular, an aspect ratio $A_{10}/A_{13}$ of 1600, for example, results in a diameter ratio of 40.

The system may comprise a fill line pressure sensor disposed and configured to sense a fill pressure which is representative of an instantaneous pressure of the compressed gas in the receiving vessel and/or in the fill line between the fill valve and the receiving vessel, and to generate a pressure signal based on the sensed fill pressure. The controller may be configured to receive the fill pressure signal from the fill pressure sensor and control the fill valve in response to the fill pressure. For example, the controller may close the fill valve to block further flow through the fill line when the fill pressure has reached a desired final target pressure. A pressure of 300 bar or greater, e.g. 350 bar or 700 bar, might be selected as the final target pressure.

The pressure signal from the fill pressure sensor may be used instead of, or in combination with, the vent pressure signal from the vent pressure sensor to determine if an in-line component of the venting subsystem is plugged. The controller may be configured to determine whether the vent valve and/or the vent line restriction is/are plugged based on the fill pressure signal during a venting operation and, if plugging is detected, prevent detachment of the discharge nozzle from the receiving vessel and/or a next dispensing process from being initiated before the plugging is cleared.

For example, the controller may be configured to receive the fill pressure signal from the fill pressure sensor during venting, calculate a deviation between the fill pressure and a reference pressure, and prevent a next dispensing process from being initiated if it is determined that the fill pressure does not fall to or below the reference pressure within a predetermined period of time beginning when venting begins. The reference pressure may be provided as a predetermined set pressure stored in a data memory of the controller or derived from a measurement of the actual ambient pressure, e.g. simply as ambient pressure or as ambient pressure plus a certain pressure difference of advantageously less than 1 bar. In a further development, the controller may be configured to receive the fill pressure signal from the fill pressure sensor and the vent pressure signal from the vent pressure sensor during venting, calculate a deviation between the fill pressure and the vent pressure, and prevent a next dispensing process from being initiated if it is determined that the deviation between the fill pressure and the vent pressure does not fall to or below a differential reference pressure within a predetermined period of time beginning with the start of venting. In this case it can be concluded that the vent valve, if present, is plugged. If, in addition, the vent pressure and/or the fill pressure is compared with a suitable reference pressure, which may be the reference pressure described previously, it can be determined whether the vent valve or the vent line restriction is plugged or whether both are plugged. The differential reference pressure can be selected to be less than 2 bar or 1 bar and in particular can be zero.

The method for dispensing the compressed gas comprises the steps of:

(a) passing compressed gas from the supply through the fill line into the receiving vessel;
(b) venting a portion of the fill line through the vent line;
(c) measuring the vent pressure;
(d) providing a reference pressure;
(e) determining a deviation between the vent pressure and the reference pressure; and
(f) controlling the fill valve in response to the determined deviation.

During dispensing the compressed gas, the vent pressure sensor can be used for leak detection. The vent pressure measurement can be used to detect a leak in the vent line, e.g. a vent valve leak, if a vent valve is present. During venting, the vent pressure sensor can be used for detecting a plugging event. For example, a plugged vent line restriction will cause an abnormally large pressure rise in the vent line, and a plugged vent valve, if present, will prevent the vent pressure from rising far enough and/or fast enough or from rising at all.

Accordingly, for leak detection, the method may comprise measuring the vent pressure and determining the deviation of the vent pressure from the reference pressure while the compressed gas is being passed through the fill line and closing the fill valve to block the flow through the fill line and terminate the dispensing, when the vent pressure is determined to be greater than the reference pressure.

To stop dispensing, after a regular dispensing process or after an irregularity has been detected, the fill valve is closed to block the flow of compressed gas through the fill line and the fill line may be vented through the vent line. Plugging of the vent line can be detected by measuring the vent pressure while venting with the fill valve closed and determining the deviation between the vent pressure and the reference pressure during venting.

If, for example, it is determined that the vent pressure does not fall below the reference pressure within a predetermined period of time beginning when the vent valve is opened, plugging of the vent line restriction can be assumed. If the vent valve is present and it is determined that the vent pressure does not rise above the reference pressure within a predetermined period of time beginning when the vent valve is opened, it can be assumed that the vent valve is plugged. If plugging of the vent line is detected, the controller may keep the fill valve closed to prevent a next dispensing process from being initiated before the cause of the plugging has been removed. The discharge nozzle may be configured so that it cannot be detached from the receiving vessel until the portion of the filling line downstream of the fill valve is depressurized. This may be a capability implemented in the discharge nozzle or, for example, the controller may be configured to control the discharge nozzle so that it cannot be detached from the receiving vessel until the portion of the filling line downstream of the fill valve is depressurized.

In the following, specific aspects of the method and system will be outlined. The reference signs and expressions set in parentheses are referring to an example embodiment explained further below with reference to FIGURES. The reference signs and expressions are, however, only illustrative and do not limit the aspect to any specific component or feature of the example embodiment. The aspects can be formulated as claims in which the reference signs and expressions set in parentheses are omitted or replaced by appropriate others.

Aspect 1 # A dispensing system for dispensing compressed gas into a receiving vessel, the dispensing system comprising:

(a) a supply (1) of compressed gas;
(b) a fill line (2) for connecting the supply (1) to the receiving vessel and comprising a discharge nozzle (9);
(c) a fill valve (6) disposed and configured to vary the flow of compressed gas through the fill line (2);
(d) a controller (20) configured to control the fill valve (6);
(e) a vent line (10) for venting the fill line (2) downstream of the fill valve (6);
(f) a vent line restriction (13) disposed and configured to restrict flow of the compressed gas through the vent line (10); and
(g) a vent pressure sensor (12) disposed and configured to sense a vent pressure which is representative of an instantaneous pressure of the compressed gas in the vent line (10) upstream of the vent line restriction (13) and to generate a vent pressure signal based on the sensed vent pressure.

Aspect 2 # The dispensing system of aspect 1, further comprising a vent valve (11) disposed upstream of the vent line restriction (13) and configured to vary the flow of compressed gas through the vent line (10).

Aspect 3 # The dispensing system of the preceding aspect, wherein the vent pressure sensor (12) is disposed and configured to sense the vent pressure downstream of the vent valve (11).

Aspect 4 # The dispensing system of aspect 2 or aspect 3, wherein the controller (20) is configured to control the vent valve (11).

Aspect 5 # The dispensing system of any one of aspects 2 to 4, wherein the controller (20) is configured to control the vent valve (11) to block the flow of compressed gas through the vent line (10) while compressed gas is being dispensed into the receiving vessel and allow the flow of compressed gas through the vent line (10) once the dispensing operation has been completed or terminated.

Aspect 6 # The dispensing system of any one of aspects 2 to 5, wherein the controller (20) is configured to control the fill valve (6) in coordination with controlling the vent valve (11) such that the fill valve (6) is opened to allow flow of compressed gas through the fill line (2) only after the vent valve (11) has been closed and blocks flow of compressed gas through the vent line (10).

Aspect 7 # The dispensing system of any one of the aspects 2 to 6, wherein the controller (20) is configured to control the vent valve (11) in coordination with controlling the fill valve (6) such that the vent valve (11) is opened and allows flow of compressed gas through the vent line (10) only after the fill valve (6) has been closed and blocks flow of compressed gas through the fill line (2).

Aspect 8 # The dispensing system of any one of the preceding aspects, wherein the dispensing system is designed for a maximum nominal pressure of 300 bar or greater and the vent line restriction (13) is configured such that depressurization of the vent line (10) from the maximum nominal pressure to a pressure of 1 bar through the vent line restriction (13) takes at least 1 second or at least 2 seconds and/or takes at most 20 seconds or at most 10 seconds.

Aspect 9 # The dispensing system of any one of the preceding aspects, wherein the vent line (10) narrows from a line cross-section, $A_{10}$, to a restriction cross-section, $A_{13}$, via the vent line restriction (13), wherein the ratio $A_{10}/A_{13}$ is greater than 200 or greater than 400.

Aspect 10 # The dispensing system of any one of the preceding aspects, wherein the vent line (10) narrows from a line cross-section, $A_{10}$, to a restriction cross-section, $A_{13}$, via the vent line restriction (13), wherein the ratio $A_{10}/A_{13}$ is smaller than 2000 or smaller than 1500.

Aspect 11 # The dispensing system of any one of the preceding aspects, further comprising a fill pressure sensor (7) disposed and configured to sense a fill pressure which is representative of an instantaneous pressure of the compressed gas in the receiving vessel and/or in the fill line (2) between the fill valve (6) and the receiving vessel, and to generate a fill pressure signal based on the sensed fill pressure.

Aspect 12 # The dispensing system of the preceding aspect, wherein the controller (20) is configured to control the fill valve (6) responsive to the fill pressure signal.

Aspect 13 # The dispensing system of aspect 11 or aspect 12, wherein the controller (20) is configured to control the vent valve (11) responsive to the fill pressure signal.

Aspect 14 # The dispensing system of any one of the preceding aspects, wherein the controller (20) is configured to monitor the vent pressure based on the vent pressure signal from the vent pressure sensor (12).

Aspect 15 # The dispensing system of any one of the preceding aspects, wherein the controller (20) is configured to control the fill valve (6) responsive to the vent pressure signal from the vent pressure sensor (12).

Aspect 16 # The dispensing system of any one of the preceding aspects, wherein the controller (20) is configured to compare the vent pressure to a reference pressure and to control the fill valve (6) in response to the comparison.

Aspect 17 # The dispensing system of any one of the preceding aspects, wherein the controller (20) is configured to calculate a deviation between the vent pressure and a reference pressure and to control the fill valve (6) in response to the deviation.

Aspect 18 # The dispensing system of aspect 16 or aspect 17, wherein the reference pressure is a predetermined set pressure or derived from the fill pressure of aspect 11.

Aspect 19 # The dispensing system of any one of the preceding aspects, wherein the controller (20) is configured to determine whether compressed gas is escaping through the vent line (10) using the vent pressure signal during dispensing and close the fill valve (6) when the determination indicates escape of compressed gas through the vent line (10).

Aspect 20 # The dispensing system of any one of the preceding aspects each in combination with aspect 2, wherein the controller (20) is configured to determine whether the vent valve (11) is leaking using the vent pressure signal during dispensing and close the fill valve (6) when the determination indicates leaking of compressed gas through the vent valve (11).

Aspect 21 # The dispensing system of any one of the preceding aspects, wherein the controller (20) is configured to determine whether the vent line restriction (13) is plugged using the vent pressure signal during venting and, if plugging is detected, to prevent detachment of the discharge nozzle (9) from the receiving vessel and/or a next dispensing process from being initiated before the plugging is cleared.

Aspect 22 # The dispensing system of any one of the preceding aspects each in combination with aspect 2, wherein the controller (20) is configured to determine whether the vent valve (11) is plugged using the vent pressure signal during a venting operation and, if plugging is detected, to prevent detachment of the discharge nozzle (9) from the receiving vessel and/or a next dispensing process from being initiated before the plugging is cleared.

Aspect 23 # The dispensing system of any one of the preceding aspects each in combination with aspect 2 and aspect 11, wherein the controller (20) is configured to determine whether the vent valve (11) and/or the vent line restriction (13) is/are plugged using the fill pressure signal during a venting operation and, if plugging is detected, to prevent detachment of the discharge nozzle (9) from the receiving vessel and/or a next dispensing process from being initiated before the plugging is cleared.

Aspect 24 # The dispensing system of any one of the preceding aspects, wherein the controller (20) is configured to receive the vent pressure signal from the vent pressure sensor (12) during dispensing and calculate a deviation between the vent pressure and a reference pressure; and the controller (20) is configured to command the fill valve (6) to block the flow of compressed gas if the vent pressure is higher than the reference pressure.

Aspect 25 # The dispensing system of any one of the preceding aspects each in combination with aspect 2, wherein the controller (20) is configured to close the fill valve (6) to block the flow of compressed gas through the fill line (2) and open the vent valve (11) to vent the fill line (2) downstream of the fill valve (6) through the vent line (10);

the controller (20) is configured to receive the vent pressure signal from the vent pressure sensor (12) during venting and calculate a deviation between the vent pressure and a reference pressure; and the controller (20) is configured to keep the fill valve (6) closed to prevent a next dispensing process from being initiated if it is determined that the vent pressure does not fall below the reference pressure within a predetermined period of time beginning when the vent valve (11) is opened.

Aspect 26 # The dispensing system of any one of the preceding aspects each in combination with aspect 2, wherein the controller (20) is configured to close the fill valve (6) to block the flow of compressed gas through the fill line (2) and open the vent valve (11) to vent the fill line (2) downstream of the fill valve (6) through the vent line (10);

the controller (20) is configured to receive the vent pressure signal from the vent pressure sensor (12) during venting and calculate a deviation between the vent pressure and a reference pressure; and the controller (20) is configured to keep the fill valve (6) closed to prevent a next dispensing process from being initiated if it is determined that the vent pressure does not rise above the reference pressure within a predetermined period of time beginning when the vent valve (11) is opened.

Aspect 27 # The dispensing system of any one of the preceding aspects each in combination with aspect 2 and aspect 11, wherein the controller (20) is configured to close the fill valve (6) to block the flow of compressed gas through the fill line (2) and open the vent valve (11) to vent the fill line (2) downstream of the fill valve (6) through the vent line (10);

the controller (20) is configured to receive the fill pressure signal from the fill pressure sensor (7) during venting and calculate a deviation between the fill pressure and a reference pressure; and the controller (20) is configured to keep the fill valve (6) closed to prevent a next dispensing process from being initiated if it is determined that the fill pressure does not fall below the reference pressure within a predetermined period of time beginning when the vent valve (11) is opened.

Aspect 28 # The dispensing system of any one of the preceding aspects each in combination with aspect 2 and aspect 11, wherein the controller (20) is configured to close the fill valve (6) to block the flow of compressed gas through the fill line (2) and open the vent valve (11) to vent the fill line (2) downstream of the fill valve (6) through the vent line (10);

the controller (20) is configured to receive the fill pressure signal from the fill pressure sensor (7) and the vent pressure signal from the vent pressure sensor (12) during venting and calculate a deviation between the fill pressure and the vent pressure; and the controller (20) is configured to keep the fill valve (6) closed to prevent a next dispensing process from being initiated if it is determined that the deviation between the fill pressure and the vent pressure does not fall below a differential reference pressure within a predetermined period of time beginning when the vent valve (11) is opened.

Aspect 29 # The dispensing system of any one of the aspects 25 to 28, wherein the controller (20) comprises a data memory and is configured to store the respective predetermined period of time in the data memory.

Aspect 30 # The dispensing system of any one of the aspects 24 to 29, wherein the controller (20) comprises a data memory and is configured to store the respective reference pressure in the data memory.

Aspect 31 # The dispensing system of any one of the preceding aspects, wherein the vent pressure sensor (12) is a pressure transmitter repeatedly sensing the vent pressure and generating a vent pressure signal; and the controller (20) is configured to receive the vent pressure signals from the vent line pressure sensor (12) and calculate a deviation between the respective vent pressure and a reference pressure.

Aspect 32 # The dispensing system of any one of aspects 1 to 30, wherein the vent pressure sensor (12) is a pressure switch configured to generate the pressure signal only when the vent pressure is higher than a reference pressure defined by the physical design of the vent line pressure sensor (12).

Aspect 33 # The dispensing system of any one of the preceding aspects, wherein the supply (1) of compressed gas comprises an on-site liquified gas reservoir and/or one or more on-site compressed gas storage vessels and/or one or more mobile compressed gas storage vessels and/or a connection to a supply pipeline.

Aspect 34 # The dispensing system of any one of the preceding aspects, wherein the supply (1) of compressed gas comprises one or more cryogenic feeding devices (pump and/or compressors) for feeding liquified gas and/or one or more compressors for pressurizing gas.

Aspect 35 # Dispensing station for dispensing compressed gas to vehicles, wherein the dispensing station comprises the dispensing system of any one of the preceding aspects and each of the vehicles comprises a respective receiving vessel as a vehicle fuel tank.

Aspect 36 #A method for dispensing a compressed gas into a receiving vessel employing a supply (1) of compressed gas and a fill line (2) operatively connecting the supply (1) to the receiving vessel, a fill valve (6) capable of varying the flow rate of compressed gas through the fill line (2), a controller (20) for controlling the fill valve (6), a vent line (10) for venting the fill line (2) downstream of the fill valve (6), a vent line restriction (13) for restricting the flow of the compressed gas through the vent line (10), and a vent pressure sensor (12) for sensing a vent pressure which is representative of an instantaneous pressure of the compressed gas in the vent line (10) upstream of the vent line restriction (13), the method comprising the steps of:

(a) passing compressed gas from the supply (1) through the fill line (2) into the receiving vessel;

(b) venting a portion of the fill line (2) through the vent line (10);

(c) measuring the vent pressure;

(d) providing a reference pressure;

(e) determining a deviation between the vent pressure and the reference pressure; and (f) controlling the fill valve (6) in response to the determined deviation.

Aspect 37 # The method of the preceding aspect, wherein the vent pressure is measured and the deviation is determined while passing the compressed gas through the fill line (2), and the fill valve (6) is closed to block the flow through the fill line (2) and to terminate the dispensing if the vent pressure is determined to be greater than the reference pressure.

Aspect 38 # The method of aspect 36 or aspect 37, furthermore employing a vent valve (11) disposed and configured to selectively block or allow the flow of compressed gas through the vent line (10); wherein the vent pressure sensor (12) is disposed and configured to sense the vent pressure downstream of the vent valve (11).

Aspect 39 # The method of the preceding aspect, comprising the steps of:

(g) closing the fill valve (6) to block the flow of compressed gas through the fill line (2) and opening the vent valve (11) to vent the portion of the fill line (2) through the vent line (10);

(h) measuring the vent pressure with the fill valve (6) closed and the vent valve (11) open; and (i) determining the deviation between the vent pressure and the reference pressure;

(j) wherein the fill valve (6) is kept closed to prevent a next dispensing process from being initiated if it is determined that the vent pressure does not fall below the reference pressure within a predetermined period of time beginning when the vent valve (11) is opened; and/or (k) wherein the fill valve (6) is kept closed to prevent a next dispensing process from being initiated if it is determined that the vent pressure does not rise above the reference pressure within a predetermined period of time beginning when the vent valve (11) is opened.

Aspect 40 # The method of the preceding aspect, comprising repeating steps (h) and (i) while venting.

Aspect 41 # The method of any one of aspects 36 to 40, furthermore employing a fill pressure sensor (7) disposed and configured to sense a fill pressure which is representative of an instantaneous pressure of the compressed gas in the receiving vessel and/or in the fill line (2) between the fill valve (6) and the receiving vessel, and to generate a fill pressure signal based on the sensed fill pressure.

Aspect 42 # The method of the preceding aspect in combination with aspect 38, comprising the steps of:

(l) closing the fill valve (6) to block the flow of compressed gas through the fill line (2) and opening the vent valve (11) to vent the portion of the fill line (2) through the vent line (10);

(m) measuring the fill pressure with the fill valve (6) closed and the vent valve (11) open; and (n) determining a deviation between the fill pressure and the reference pressure;

(o) wherein the fill valve (6) is kept closed to prevent a next dispensing process from being initiated if it is determined that the fill pressure does not fall below the reference pressure within a predetermined period of time beginning when the vent valve (11) is opened.

Aspect 43 # The method of the preceding aspect, comprising repeating steps (m) and (n) while venting.

Aspect 44 # The method of aspect 41 in combination with aspect 38, comprising the steps of:

(p) closing the fill valve (6) to block the flow of compressed gas through the fill line (2) and opening the vent valve (11) to vent the portion of the fill line (2) through the vent line (10);

(q) measuring the fill pressure and the vent pressure with the fill valve (6) closed and the vent valve (11) open; and (r) determining a deviation between the fill pressure and the vent pressure;

(s) wherein the fill valve (6) is kept closed to prevent a next dispensing process from being initiated if it is determined that the fill pressure does not fall below a differential reference pressure within a predetermined period of time beginning when the vent valve (11) is opened.

Aspect 45 # The method of the preceding aspect, comprising repeating steps (q) and (r) while venting.

Aspect 46 # The method of any one of aspects 36 to 45, comprising repeating steps (c) to (e) while passing the compressed gas to the receiving vessel.

The reference pressure may be provided as a predetermined set pressure or derived from the actual ambient pressure on site, unless otherwise described in the respective context. The reference pressure may be lower than 10 bar or lower than 5 bar. It may be greater than 1 bar or greater than 2 bar.

As far as letters are used in the claims and aspects to identify claimed steps (e.g. (a), (b), and (c)), these letters are used to aid in referring to the method steps and are not intended to indicate the order in which claimed steps are performed, unless and only to the extent that such order is specifically recited in the claims.

BRIEF DESCRIPTION OF THE DRAWING

FIG. 1 illustrates a method and system for dispensing a compressed gas into a compressed gas receiving vessel.

DETAILED DESCRIPTION

The ensuing detailed description provides a preferred exemplary embodiment only, and is not intended to limit the scope, applicability, or configuration of the invention. Rather, the ensuing detailed description of the preferred exemplary embodiment will provide those skilled in the art with an enabling description for implementing the preferred exemplary of the invention, it being understood that various changes may be made in the function and arrangement of elements without departing from the scope of the invention as defined by the claims.

The FIGURE shows a system for dispensing a compressed gas into a compressed gas receiving vessel as in particular a fuel tank of a combustion engine or fuel cell vehicle, or some other pressure rated receiving vessel. The dispensing system may be a compressed gas dispensing station or part of a compressed gas dispensing station for refueling cars, trucks, and other vehicles that use the compressed gas as fuel. The FIGURE also illustrates a method of dispensing the compressed gas, including venting a portion of the dispensing system upon completion or termination of the dispensing process.

The dispensing system comprises a supply 1 of compressed gas and a fill line 2 for connecting the supply 1 to the receiving vessel. The supply 1 comprises one or more sources of compressed gas and/or liquified gas, such as one or more storage vessels containing compressed gas and/or one or more storage vessels containing liquified gas and/or a standing connection connecting the supply 1 to a remote gas source via a supply line. The supply 1 may further comprise one or more liquid gas pumps and/or one or more compressors to feed and/or pressurize the gas. The supply 1 may further comprise other components for conditioning the gas, such as one or more heat exchangers for indirect heat exchange and/or one or more electrical heaters and/or coolers, and/or vaporizers and the like, to condition the gas for dispensing it to the respective receiving vessel. The compressed gas may be hydrogen, natural gas, one or more hydrocarbons, and mixtures thereof and may particularly comprise hydrogen or consist of hydrogen.

An upstream end of the fill line 2 is connected to the supply 1. The fill line 2 may comprise a block valve 3, a thermal treatment arrangement 4, a fill valve 6, a breakaway coupler 8, and a discharge nozzle 9 forming a downstream end of the fill line 2. The block valve 3 can be used to isolate the supply 1 from the downstream components of the dispensing system, e.g. for maintenance and/or repair or in emergencies. The block valve 3 may be designed for manual operation, i.e. it can be provided as a manual block valve 3 to enable separation from the supply 1 even in the event of a power failure.

The thermal treatment arrangement 4 may comprise one or more heat exchangers for heating the compressed gas, particularly in embodiments where the compressed gas is provided from a liquified gas source. The thermal treatment arrangement 4 may instead or in addition comprise one or more heat exchangers for cooling the compressed gas, which may be necessary if the compressed gas is provided from a compressed gas storage vessel or has been warmed in the fill line 2 and has reached a temperature above the permissible dispensing temperature. The thermal treatment arrangement 4 may comprise one or more electrical heaters and/or coolers instead or in addition to one or more heat exchangers.

The dispensing system comprises a controller 20 for automatically controlling the dispensing process. In particular, the controller 20 may be in the form of an electronic control unit. The controller 20 may further be configured to monitor the dispensing process, wherein the control function and the monitor function may be integrated in a single control and monitoring unit or in separate devices that, in expedient embodiments, are data-linked.

The fill valve 6 is configured to vary the flow of compressed gas through the fill line 2 in response to command signals from the controller 20. Advantageously, it may be in the form of a shut-off valve that can be automatically switched between "open" and "closed" to allow either full flow or minimum flow, the minimum flow being expediently zero flow.

The discharge nozzle 9 is configured to be connected to and disconnected from the inlet of the respective receiving vessel. The fill line 2 may comprise a flexible hose, with the discharge nozzle 9 disposed at the downstream end of the hose.

The dispensing system further comprises a vent subsystem for venting the fill line 2 once dispensing the compressed gas to the respective receiving vessel has been completed or otherwise terminated. The vent subsystem comprises a vent line 10 connected to the fill line 2 downstream of the fill valve 6, a vent valve 11, and a vent line restriction 13. The vent line 10 may be connected to the fill line 2 upstream of the breakaway coupler 8. The vent valve 11 is configured to vary the flow of compressed gas through the vent line 10 in response to command signals from the controller 20. Advantageously, it may be in the form of a shut-off valve that can be automatically switched between "open" and "closed" to allow either full flow or zero flow. The vent line restriction 13 is disposed in the vent line 10 downstream of the vent valve 11. It may form the downstream end of the vent line 10. The vent line restriction 13 forms a local flow resistance, e.g. an orifice, to avoid unpleasantly loud noises when venting the fill line 2 from high pressures. It may be configured such that pressure equalization with the environment takes at least 1 second or at least 2 seconds if the fill line 2 is vented from a high pressure of, for example, 300 bar or more. On the other hand, it should be configured so that pressure equalization takes no more than 20 seconds or no more than 10 seconds from any pressure for which the system is rated.

The dispensing system comprises sensors for monitoring and controlling the temperature and pressure of the compressed gas, and for determining the amount of compressed gas dispensed to each receiving vessel. In the example, the amount of gas dispensed is measured and determined by means of a flow meter 5 disposed and configured to measure the flow rate of compressed gas through the fill line 2 and to send a flow rate signal representative of the flow rate to the controller 20. The signal connection between the flow meter 5 and the controller 20 is shown in a broken line. The controller 20 is configured to receive the flow rate signal from the flow meter 5 and calculate the total amount of compressed gas dispensed to the respective receiving vessel based on the flow rate signal from the flow meter 5.

The dispensing system may comprise a fill pressure sensor 7 disposed and configured to sense a fill pressure representative of an instantaneous pressure of the compressed gas in the receiving vessel. The fill pressure may be sensed directly in the respective receiving vessel, or at a receiving vessel wall, or at the receiving vessel inlet. In the example embodiment, the fill pressure sensor 7 is disposed and configured to sense a fill pressure representative of an instantaneous pressure of the compressed gas in the fill line 2 between the fill valve 6 and the receiving vessel, and to generate a fill pressure signal based on the sensed fill pressure. The fill pressure sensor 7 may be disposed upstream of the breakaway coupler 8. The controller 20 is configured to receive the fill pressure signal from the fill pressure sensor 7 and to control the fill valve 6 and the vent valve 11 in response to the fill pressure signal from the fill pressure sensor 7. The signal connections between the fill pressure sensor 7 and the controller 20 and between the fill valve 6 and the controller 20 are each shown in a broken line.

The vent subsystem comprises a vent pressure sensor 12 disposed and configured to sense a vent pressure which is representative of an instantaneous pressure of the compressed gas in the vent line 10 downstream of the vent valve 11 and upstream of the vent line restriction 13. The vent pressure sensor 12 is further configured to generate a vent pressure signal from the sensed vent pressure. The controller 20 is configured to receive the vent pressure signal from the vent pressure sensor 12. The signal connection between the vent pressure sensor 12 and the controller 20 is shown in a broken line.

The controller 20 is further configured to generate an output signal based on the vent pressure signal. This output signal may be used to monitor the vent pressure, for example on a visual display, and/or to generate an alarm if an unusual venting event has been detected.

The controller 20 is configured to control the vent valve 11 in response to the fill pressure signals received from the fill pressure sensor 7. The signal connection between the controller 20 and the vent valve 11 is shown in a broken line. For example, once the fill pressure sensed by the fill pressure sensor 7 has reached a predetermined maximum value for which the respective receiving vessel is rated, the controller 20 commands the fill valve 6 to close the fill line 2, thereby isolating the discharge nozzle 9 from the supply 1 and the section of the fill line 2 located upstream of the fill valve 6. As soon as the fill valve 6 is closed, the controller 20 commands the vent valve 11 to open, so that the fill line 2 from the discharge nozzle 9 to the fill valve 6 is vented through the vent line 10, i.e. the downstream section of the fill line 2 is pressure equalized with the environment via the vent valve 11 and the vent line restriction 13. After venting, the discharge nozzle 9 can be disconnected from the receiving vessel and connected to the next receiving vessel.

With the venting pressure sensor 12, the dispensing system is capable not only of performing a regular dispensing process, but also of monitoring the venting operation as such and detecting the occurrence of leaks and/or plugging of the components of the vent subsystem and, based thereon, intervening in the dispensing process if necessary. A leaking vent valve 11, if undetected, can result in overbilling of the customer because the flow meter 5 measures the gas flow through the fill line 2 including the gas escaping through the leaking vent valve 11. In the event the vent valve 11 and/or of the vent line restriction 13 is plugged, venting the fill line 2 following the dispensing process will take longer or even be prevented. Attempting to detach the discharge nozzle 8 from the receiving vessel becomes hazardous.

With the venting pressure sensor 12, a leak of the vent valve 11 can be determined while compressed gas is dispensed to the receiving vessel. During the dispensing process, the fill valve 6 is open and the vent valve 11 is closed. The vent line 10 downstream of the vent valve 11 should have pressure equalized with the environment, typically the ambient air, and the vent pressure sensor 12 should sense a vent pressure equal to the environmental pressure, which may be the ambient or atmospheric pressure on site. If the vent pressure sensor 12 senses a vent pressure greater than a set pressure or a pressure increase in the vent line 10, this is an indication of a leaking vent valve 11. In this event, the system may sound an alarm and/or prevent future fills until the cause, i.e. the leaking vent valve 11, has been fixed.

During dispensing, the vent pressure sensor 12 may sense the vent pressure repeatedly, namely, continuously or periodically or aperiodically, and generate corresponding vent pressure signals. The controller 20 may receive the vent pressure signals and compare the sensed respective vent pressure with the set pressure and/or the vent pressure previously sensed during the same dispensing operation. The set pressure may be equal to or slightly higher than the environmental pressure. The set pressure may be a pressure level which must be reached by venting in order to be able to detach the discharge nozzle 8 from the receiving vessel. The controller 20 may calculate a deviation between the sensed vent pressure and the respective reference pressure, i.e. the set pressure or the previously sensed vent pressure. The deviation may be calculated as a difference or a ratio between the sensed vent pressure and the reference pressure. If the controller 20 determines that the sensed vent pressure is greater than the set pressure and/or increases during dispensing, this is an indication of a leaking vent valve 11.

During the venting operation, plugging of the vent line restriction 13 can be detected by means of the venting pressure sensor 12. The vent line 10 and together therewith the fill line 2 downstream of the fill valve 6 should pressure equalize with the environment within seconds, for example, within 20 seconds or preferably within 10 seconds. If the vent pressure sensor 12 detects that the vent pressure is above the set pressure after a specified time duration of venting, e.g. within 20 seconds or 10 seconds after the vent valve 11 has been opened, it can be concluded that the vent line restriction 13 is blocked. If depressurizing the vent line 10 exceeds the specified time duration, e.g. 20 seconds or 10 seconds, the system may sound an alarm and/or prevent detachment of the discharge nozzle 8 and/or prevent future fills until the cause, i.e. the plugged vent line restriction 13, has been fixed.

During a venting operation, plugging of the vent valve 11 can be also detected. When a dispensing process has been completed or terminated for some other reason and the fill valve 6 accordingly been closed and the vent valve 11 opened, the vent pressure sensor 12 should sense a pressure increase or a vent pressure above a reference pressure, which in this case is a minimum pressure. The minimum pressure may be equal to or slightly lower than the fill pressure sensed by the fill pressure sensor 7 just before opening the vent valve 11. If the vent pressure sensor 12 does not detect an increase in vent pressure, or only a time delayed or insufficient vent pressure increase, or if the sensed vent pressure does not exceed the minimum pressure, it can be concluded that the vent valve 11 is blocked. In this event, the system may sound an alarm and/or prevent detachment of the discharge nozzle 8 and/or prevent future fills until the cause, i.e. the plugged vent valve 11, has been fixed.

During venting, the vent pressure sensor 12 may sense the vent pressure repeatedly, namely, continuously or periodically or aperiodically, and generate corresponding vent pressure signals. The controller 20 may receive the vent pressure signals and compare the sensed respective vent pressure with a reference pressure and/or the vent pressure previously sensed during the same venting operation. The controller 20 may calculate a deviation between the sensed vent pressure and the reference pressure. The deviation may be calculated as a difference or a ratio between the sensed vent pressure and the reference pressure. For detecting a plugged vent valve 11, the above-mentioned minimum pressure or a vent pressure sensed previously during the same venting operation may be taken. For detecting a plugged vent line restriction 13, the set pressure mentioned above or a vent pressure sensed previously during the same venting operation may be taken. If the controller 20 determines that the sensed vent pressure does not increase after opening the vent valve 11 or does not exceed the minimum pressure, this is an indication of a plugged vent valve 11. If the controller 20 determines that the sensed vent pressure does not decrease to or below the set pressure within a specified time duration, this is an indication of a plugged vent line restriction 13.

Plugging of the vent valve 11 can be detected by means of the vent pressure signal of the vent pressure sensor 12 alone. However, the fill pressure signal of the fill pressure sensor 7 also provides a—often more reliable—means of detecting this type of malfunction. When the fill valve 6 is closed to block the flow of compressed gas through the fill line 2 and the vent valve 11 open to vent the fill line 2 downstream of the fill valve 6 through the vent line 10 the fill pressure may still be sensed by the fill pressure sensor 7. The controller 20 may receive the fill pressure signal from the fill pressure sensor 7 and use the fill pressure signal to determine whether the venting operation is proceeding properly or whether the vent line 10 is plugged. The controller 20 may use the fill pressure instead of the vent pressure, or in combination with the vent pressure, to detect a plugging event in the vent line 10.

In a first variant, the controller 20 may determine a deviation between the fill pressure and a reference pressure, which as previously mentioned may be, for example, a predetermined set pressure or the ambient pressure or the ambient pressure plus a certain pressure differential. The controller 20 may keep the fill valve 6 closed to prevent a next dispensing process from being initiated if it is determined that the fill pressure does not fall below the reference pressure within a predetermined period of time beginning when the vent valve 11 is opened.

In a second variant, the controller 20 may determine a deviation between the fill pressure and the vent pressure. The controller 20 may keep the fill valve 6 closed to prevent a next dispensing process from being initiated if it is determined that the fill pressure does not fall to or below a differential reference pressure within a predetermined period of time beginning when the vent valve 11 is opened. The differential reference pressure may in particular be zero or at most 2 bar or at most 1 bar. If the fill pressure does not fall to or below the differential reference pressure, it can be assumed that the vent valve 11 is plugged. If the fill pressure falls to or below the differential reference pressure, while a further comparison determines that the vent pressure does not fall to or below the reference pressure, it can be assumed that the vent line restriction 13 is plugged.

What is claimed is:

1. A dispensing system for dispensing compressed gas into a receiving vessel, the dispensing system comprising:

a supply of compressed gas;

a fill line for connecting the supply of compressed gas to the receiving vessel, the fill line comprising a discharge nozzle;

a fill valve disposed and configured to vary the flow of the compressed gas through the fill line;

a controller configured to control the fill valve;

a vent line for venting the fill line downstream of the fill valve;

a vent line restriction disposed and configured to restrict flow of the compressed gas through the vent line; and a vent pressure sensor disposed and configured (i) to sense a vent pressure which is representative of an instantaneous pressure of the compressed gas in the vent line upstream of the vent line restriction and (ii) to generate a vent pressure signal based on the sensed vent pressure;

wherein the controller is configured to determine whether compressed gas is escaping through the vent line using the vent pressure signal during dispensing and close the fill valve when the determination indicates escape of compressed gas through the vent line; and/or wherein the controller is configured to determine whether the vent line restriction is plugged using the vent pressure signal during venting and, if plugging is detected, to prevent detachment of the discharge nozzle from the receiving vessel and/or a next dispensing process from being initiated before the plugging is cleared.

2. The dispensing system of claim 1, further comprising a vent valve disposed upstream of the vent line restriction and configured to vary the flow of the compressed gas through the vent line.

3. The dispensing system of claim 2, wherein the controller is configured to control the vent valve to block the flow of compressed gas through the vent line while compressed gas is being dispensed into the receiving vessel and allow the flow of compressed gas through the vent line once the dispensing operation has been completed or terminated.

4. The dispensing system of claim 1, wherein the vent line narrows from a line cross-section, $A_{10}$, to a restriction cross-section, $A_{13}$, via the vent line restriction, wherein the ratio $A_{10}/A_{13}$ is greater than 200.

5. The dispensing system of claim 1, further comprising a fill pressure sensor disposed and configured to sense a fill pressure which is representative of an instantaneous pressure of the compressed gas in the receiving vessel and/or in the fill line between the fill valve and the receiving vessel, and to generate a fill pressure signal based on the sensed fill pressure.

6. The dispensing system of claim 5, wherein the controller is configured to control the fill valve responsive to the fill pressure signal.

7. The dispensing system of claim 1, wherein the controller is configured to control the fill valve responsive to the vent pressure signal from the vent pressure sensor.

8. The dispensing system of claim 1, wherein the controller is configured to compare the vent pressure to a reference pressure and to control the fill valve in response to the comparison of the vent pressure and the reference pressure.

9. The dispensing system of claim 1, wherein the vent pressure sensor is a pressure switch configured to generate the pressure signal only when the vent pressure is higher than a reference pressure defined by the physical design of the vent line pressure sensor.

10. The dispensing system of claim 1, wherein the supply of the compressed gas comprises one or more of the following: (i) an on-site liquified gas reservoir, (ii) an on-site compressed gas storage vessel, (iii) a mobile compressed gas storage vessel, (iv) a connection to a supply pipeline.

11. A dispensing station for dispensing compressed gas to a vehicle, wherein the dispensing station comprises the dispensing system of claim 1 and the vehicle comprises a respective receiving vessel as a vehicle fuel tank.

12. A method for dispensing a compressed gas into a receiving vessel comprising a supply of compressed gas and a fill line operatively connecting the supply of compressed gas to the receiving vessel, a fill valve for varying the flow rate of the supply of compressed gas through the fill line, a controller for controlling the fill valve, a vent line for venting the fill line downstream of the fill valve, a vent line restriction for restricting the flow of the supply of compressed gas through the vent line, a vent pressure sensor for sensing a vent pressure which is representative of an instantaneous pressure of the compressed gas in the vent line upstream of the vent line restriction and a vent valve disposed and configured to selectively block or allow the flow of compressed gas through the vent line, wherein the vent pressure sensor is disposed and configured to sense the vent pressure downstream of the vent valve, the method comprising the steps of:

passing compressed gas from the supply of compressed gas through the fill line into the receiving vessel;

venting a portion of the fill line through the vent line;

measuring the vent pressure;

providing a reference pressure;

determining a deviation between the vent pressure and the reference pressure;

controlling the fill valve in response to the determined deviation;

closing the fill valve to block the flow of compressed gas through the fill line and opening the vent valve to vent the portion of the fill line through the vent line;

measuring the vent pressure while venting with the fill valve closed; and determining the deviation between the vent pressure and the reference pressure while venting;

wherein the fill valve is kept closed to prevent a next dispensing process from being initiated if it is determined that the vent pressure does not fall below the reference pressure within a predetermined period of time beginning when the vent valve is opened; and/or wherein the fill valve is kept closed to prevent a next dispensing process from being initiated if it is determined that the vent pressure does not rise above a minimum pressure within a predetermined period of time beginning when the vent valve is opened.

13. The method of claim 12, wherein the vent pressure is measured, and the deviation is determined while passing the compressed gas through the fill line, and the fill valve is closed to block the flow through the fill line and to terminate the dispensing if the vent pressure is determined to be greater than the reference pressure.

14. The method of claim 12, wherein the reference pressure is lower than 10 bar, and greater than 1 bar.

15. A dispensing system for dispensing compressed gas into a receiving vessel, the dispensing system comprising:

a supply of compressed gas;

a fill line for connecting the supply of compressed gas to the receiving vessel, the fill line comprising a discharge nozzle;

a fill valve disposed and configured to vary the flow of the compressed gas through the fill line;

a controller configured to control the fill valve;

a vent line for venting the fill line downstream of the fill valve;

a vent line restriction disposed and configured to restrict flow of the compressed gas through the vent line; and a vent pressure sensor disposed and configured (i) to sense a vent pressure which is representative of an instantaneous pressure of the compressed gas in the vent line upstream of the vent line restriction and (ii) to generate a vent pressure signal based on the sensed vent pressure;

wherein the vent pressure sensor is a pressure transmitter repeatedly sensing the vent pressure and generating a vent pressure signal; and the controller is configured to receive the vent pressure signals from the vent line pressure sensor and calculate a deviation between the respective vent pressure and a reference pressure.

16. A dispensing system for dispensing compressed gas into a receiving vessel, the dispensing system comprising:

a supply of compressed gas;
a fill line for connecting the supply of compressed gas to the receiving vessel, the fill line comprising a discharge nozzle;
a fill valve disposed and configured to vary the flow of the compressed gas through the fill line;
a controller configured to control the fill valve;
a vent line for venting the fill line downstream of the fill valve;
a vent line restriction disposed and configured to restrict flow of the compressed gas through the vent line;
a vent pressure sensor disposed and configured (i) to sense a vent pressure which is representative of an instantaneous pressure of the compressed gas in the vent line upstream of the vent line restriction and (ii) to generate a vent pressure signal based on the sensed vent pressure; and
a vent valve disposed upstream of the vent line restriction and configured to vary the flow of the compressed gas through the vent line;
wherein the controller is configured to determine whether the vent valve is plugged using the vent pressure signal during venting and, if plugging is detected, to prevent detachment of the discharge nozzle from the receiving vessel and/or a next dispensing process from being initiated before the plugging is cleared.

17. A method for dispensing a compressed gas into a receiving vessel comprising a supply of compressed gas and a fill line operatively connecting the supply of compressed gas to the receiving vessel, a fill valve for varying the flow rate of the supply of compressed gas through the fill line, a controller for controlling the fill valve, a vent line for venting the fill line downstream of the fill valve, a vent line restriction for restricting the flow of the supply of compressed gas through the vent line, a vent pressure sensor for sensing a vent pressure which is representative of an instantaneous pressure of the compressed gas in the vent line upstream of the vent line restriction, a fill pressure sensor disposed and configured to sense a fill pressure which is representative of an instantaneous pressure of the compressed gas in the receiving vessel and/or in the fill line between the fill valve and the receiving vessel, and to generate a fill pressure signal based on the sensed fill pressure and a vent valve disposed and configured to selectively block or allow the flow of compressed gas through the vent line, wherein the vent pressure sensor is disposed and configured to sense the vent pressure downstream of the vent valve, the method comprising the steps of:
passing compressed gas from the supply of compressed gas through the fill line into the receiving vessel;
venting a portion of the fill line through the vent line;
measuring the vent pressure;
providing a reference pressure;
determining a deviation between the vent pressure and the reference pressure;
controlling the fill valve in response to the determined deviation;
closing the fill valve to block the flow of compressed gas through the fill line and opening the vent valve to vent the portion of the fill line through the vent line;
measuring the fill pressure and the vent pressure with the fill valve closed and the vent valve pen; and
determining a deviation between the fill pressure and the vent pressure;
wherein the fill valve is kept closed to prevent a next dispensing process from being initiated if it is determined that the fill pressure does not fall below a differential reference pressure within a predetermined period of time beginning when the vent valve is opened.

* * * * *